United States Patent
Kita (10) Patent No.: US 10,311,550 B2
(45) Date of Patent: Jun. 4, 2019

(54) IMAGE PROCESSING DEVICE FOR ELIMINATING GRAININESS OF IMAGE

(71) Applicant: NORITSU PRECISION CO., LTD., Wakayama-shi, Wakayama (JP)

(72) Inventor: Koji Kita, Wakayama (JP)

(73) Assignee: NORITSU PRECISION CO., LTD., Wakayama-shi (JP)

(*) Notice: Subject to any disclaimer, the term of this patent is extended or adjusted under 35 U.S.C. 154(b) by 0 days.

(21) Appl. No.: 15/128,290

(22) PCT Filed: Jan. 20, 2015

(86) PCT No.: PCT/JP2015/051362
§ 371 (c)(1),
(2) Date: Sep. 22, 2016

(87) PCT Pub. No.: WO2015/146240
PCT Pub. Date: Oct. 1, 2015

(65) Prior Publication Data
US 2017/0193636 A1    Jul. 6, 2017

(30) Foreign Application Priority Data
Mar. 27, 2014 (JP) .................. 2014-066864

(51) Int. Cl.
G06T 5/00 (2006.01)
G06T 7/13 (2017.01)
H04N 1/409 (2006.01)

(52) U.S. Cl.
CPC .............. *G06T 5/002* (2013.01); *G06T 7/13* (2017.01); *H04N 1/4092* (2013.01); *G06T 2207/20192* (2013.01)

(58) Field of Classification Search
CPC ................... G06T 5/002; G06T 7/13
See application file for complete search history.

(56) References Cited

U.S. PATENT DOCUMENTS

| 5,774,599 A * | 6/1998 | Muka ............... G06T 5/009 378/98.2 |
| 6,055,340 A | 4/2000 | Nagao |
| 2003/0161520 A1* | 8/2003 | Yamano ............. G06T 5/004 382/128 |
| 2004/0159812 A1 | 8/2004 | Kaneda et al. |

(Continued)

FOREIGN PATENT DOCUMENTS

| CN | 1521695 A | 8/2004 |
| JP | H11-27533 A | 1/1999 |

(Continued)

OTHER PUBLICATIONS

Xu et al. ("The rapid method for road extraction from high-resolution satellite images based on USM algorithm," International Conference on Image Analysis and Signal Processing, Nov. 9-11, 2012) (Year: 2012).*

(Continued)

*Primary Examiner* — Yubin Hung
(74) *Attorney, Agent, or Firm* — Westerman, Hattori, Daniels & Adrian, LLP (57) ABSTRACT

Provided is an image processing device by which graininess of a target image is eliminated while outlines in the target image are maintained. The image processing device includes a smoothing unit and a weighted averaging unit. The smoothing unit is configured to generate a smooth image by smoothing the target image. The weighted averaging unit is configured to generate a weighted average image by performing weighted averaging of the target image and a difference image. The difference image is an image that is obtained by subtracting the target image from the smooth image.

10 Claims, 8 Drawing Sheets

(56) References Cited

U.S. PATENT DOCUMENTS

| | | | | |
|---|---|---|---|---|
| 2006/0257013 | A1* | 11/2006 | Ramm | G01N 15/1475 |
| | | | | 382/133 |
| 2007/0145317 | A9* | 6/2007 | Kobayashi | F16K 31/0613 |
| | | | | 251/129.15 |
| 2008/0252791 | A1* | 10/2008 | Mitsunaga | H04N 5/20 |
| | | | | 348/673 |
| 2009/0268253 | A1 | 10/2009 | Kudou | |
| 2010/0177979 | A1* | 7/2010 | Kotani | G06T 5/003 |
| | | | | 382/255 |
| 2010/0310191 | A1* | 12/2010 | Sato | H04N 7/0132 |
| | | | | 382/276 |
| 2011/0103673 | A1* | 5/2011 | Rosenstengel | G06T 7/0012 |
| | | | | 382/132 |
| 2012/0213411 | A1 | 8/2012 | Nozaki | |

FOREIGN PATENT DOCUMENTS

| | | |
|---|---|---|
| JP | 2009-267671 A | 11/2009 |
| JP | 2010-57157 A | 3/2010 |
| JP | 2011-133683 A | 7/2011 |
| WO | 2011/055772 A1 | 5/2011 |

OTHER PUBLICATIONS

Kim et al. ("Optimal unsharp mask for image sharpening and noise removal," Journal of Electronic Imaging 14(2), 2005) (Year: 2005).*
International Search Report dated Mar. 31, 2015, issued in counterpart International Application No. PCT/JP2015/051362 (1 page).
Extended European Search Report dated Jul. 17, 2017, issued in European Patent Application No. 15768884.7 (PCT/JP2015/051362).
Office Action dated Jul. 23, 2018, issued in counterpart Chinese application No. 201580008441.9, with English translation. (17 pages).
Office Action dated Dec. 25, 2018, issued in counterpart Japanese application no. 2016-510074, with English translation. (7 pages).
Office Action dated Mar. 25, 2019, issued in counterpart CN application no. 201580008441.9, with English translation. (10 pages).

* cited by examiner

IMAGE PROCESSING DEVICE FOR ELIMINATING GRAININESS OF IMAGE

TECHNICAL FIELD

The present invention relates to an image processing device, an image processing program, and an image processing method by which graininess of a target image is eliminated.

BACKGROUND ART

An image obtained by capturing an image displayed on a monitor screen with a camera is grainy due to a dot pattern of the screen appearing in the captured image. In order to eliminate the graininess from such an image, it is conceivable to use a well-known noise removal technique to smooth the image. Smoothing processing is processing for replacing the pixel value of each pixel with an average of the pixel values of pixels in a neighboring region of the pixel. Here, simple averaging processing may be performed, or weighted averaging of the pixel values of the neighboring region using various types of filters such as Gaussian filters or median filters may also be performed. The size (often expressed by "radius") of the neighboring region serves as a parameter of the smoothing processing. The larger the size of the neighboring region, the easier the noise will be removed.

However, if a noisy image is smoothed, not only noise will be removed but also outlines (edges) will be blurred. In order to address such problems, Patent Literature 1 discloses a technique in which the size of a neighboring region of each target pixel is set so that the strength of edges in the neighboring region is at a threshold or greater, and the smoothing strength is changed according to the size of the neighboring region. In other words, the size of the neighboring region is set to be smaller in a section in which edges are converged, whereas the size of the neighboring region is set to be larger in a section in which less edges are present.

CITATION LIST

Patent Literature

Patent Literature 1: JP 2010-057157A

SUMMARY OF INVENTION

Technical Problem

As described above, the method of Patent Literature 1 needs to detect outlines (edges). However, a dot pattern that appears due to close-up capturing of the above-described monitor screen is likely to disturb the detection of outlines. Accordingly, with the method of Patent Literature 1, it is difficult to eliminate the graininess such as the above-described dot pattern.

It is an object of the present invention to provide an image processing device, an image processing program, and an image processing method that can eliminate the graininess of a target image while maintaining outlines therein.

Solution to Problem

According to a first aspect of the present invention, an image processing device for eliminating graininess of a target image includes a smoothing unit and a weighted averaging unit. The smoothing unit is configured to generate a smooth image by smoothing the target image. The weighted averaging unit is configured to generate a weighted average image by performing weighted averaging of the target image and a difference image. The difference image is an image that is obtained by subtracting the target image from the smooth image.

Here, first, the target image is smoothed, and thus the smooth image is generated. The smooth image is an image that is less grainy than the target image. Accordingly, in the difference image that is obtained by subtracting the target image from the smooth image, the pixel values of pixels that are not grainy are substantially 0, the pixel values of pixels that have dark graininess have positive values, and the pixel values of pixels that have bright graininess have negative values. As a result, the weighted average image that is obtained by performing weighted averaging of the difference image and the target image is an image in which the graininess has been eliminated (suppressed). Note that in the smooth image, not only the graininess is reduced but also outlines are blurred. However, fine features such as the graininess have a higher spatial frequency than that of the outlines, and thus are more susceptible to the influence of smoothing. Therefore, much more pieces of information regarding the graininess than information regarding the outlines remain in the difference image. Accordingly, in such a weighted average image of the difference image and the target image, graininess is effectively eliminated while outlines relatively remain as they are. Accordingly, here, generating the weighted average image as described above makes it possible to eliminate the graininess of the target image while maintaining the outlines therein.

Note that, although it was described in the description above that the pixel values of pixels of the difference image that have bright graininess have negative values, image processing is typically and often defined such that pixel values cannot have negative values. In such a case, an image obtained by uniformly increasing the pixel values of pixels (for example, by uniformly adding 128 to each pixel value when the pixel value ranges from 0 to 255), as with typical image processing, is referred to as the "difference image".

According to a second aspect of the present invention, the image processing device according to the first aspect further includes a contrast enhancing unit. The contrast enhancing unit is configured to enhance a contrast of the weighted average image.

The difference image that is obtained by subtracting the target image from the smooth image is an image in which there is little variation in the pixel values. For example, if all image defined as a color image constituted by a plurality of color components that ranges from to 0 to 255, the difference image is a grayish image. Accordingly, the weighted average image, to which such a difference image has been added, is an image that has a low contrast. Therefore, here, by additionally performing processing for enhancing the contrast of the weighted average image, the reduction in the contrast due to the superimposing of the difference image is compensated.

According to a third aspect of the present invention, the image processing device according to the first or second aspect is such that the weighted averaging unit is configured to generate the difference image obtained by subtracting the target image from the smooth image, and then generate the weighted average image by performing weighted averaging of the target image and the difference image.

Here, the difference image is first generated, and then weighted averaging of the difference image and the target image is performed.

According to a fourth aspect of the present invention, the image processing device according to the second aspect is such that the weighted averaging unit is configured to generate an inverse difference image obtained by subtracting the smooth image from the target image, and then generate the difference image by inverting a tone of the inverse difference image.

Here, in order to generate the difference image that is obtained by subtracting the target image from the smooth image, first, the inverse difference image is generated by subtracting the smooth image from the target image, and then a tone of the inverse difference image is inverted.

According to a fifth aspect of the present invention, an image processing program for eliminating graininess of a target image causes a computer to execute the steps of:

1) generating a smooth image by smoothing the target image; and 2) generating a weighted average image by performing weighted averaging of the target image and a difference image obtained by subtracting the target image from the smooth image.

Here, the same effects as those of the first aspect can be obtained.

According to a sixth aspect of the present invention, an image processing method for eliminating graininess of a target image includes the steps of:

1) generating smooth image by smoothing the target image so that the graininess remains in the smooth image; and 2) generating a weighted average image by performing weighted averaging of the target image and a difference image obtained by subtracting the target image from the smooth image.

Here, the same effects as those of the first aspect can be obtained.

Advantageous Effects of Invention

According to the present invention, it is possible to eliminate the graininess of a target image while maintaining outlines therein.

DESCRIPTION OF EMBODIMENTS

Hereinafter, an image processing device, an image processing program, and an image processing method according to an embodiment of the present invention will be described with reference to the drawings.

<1. Summary of Image Processing Device>

Figure 1:
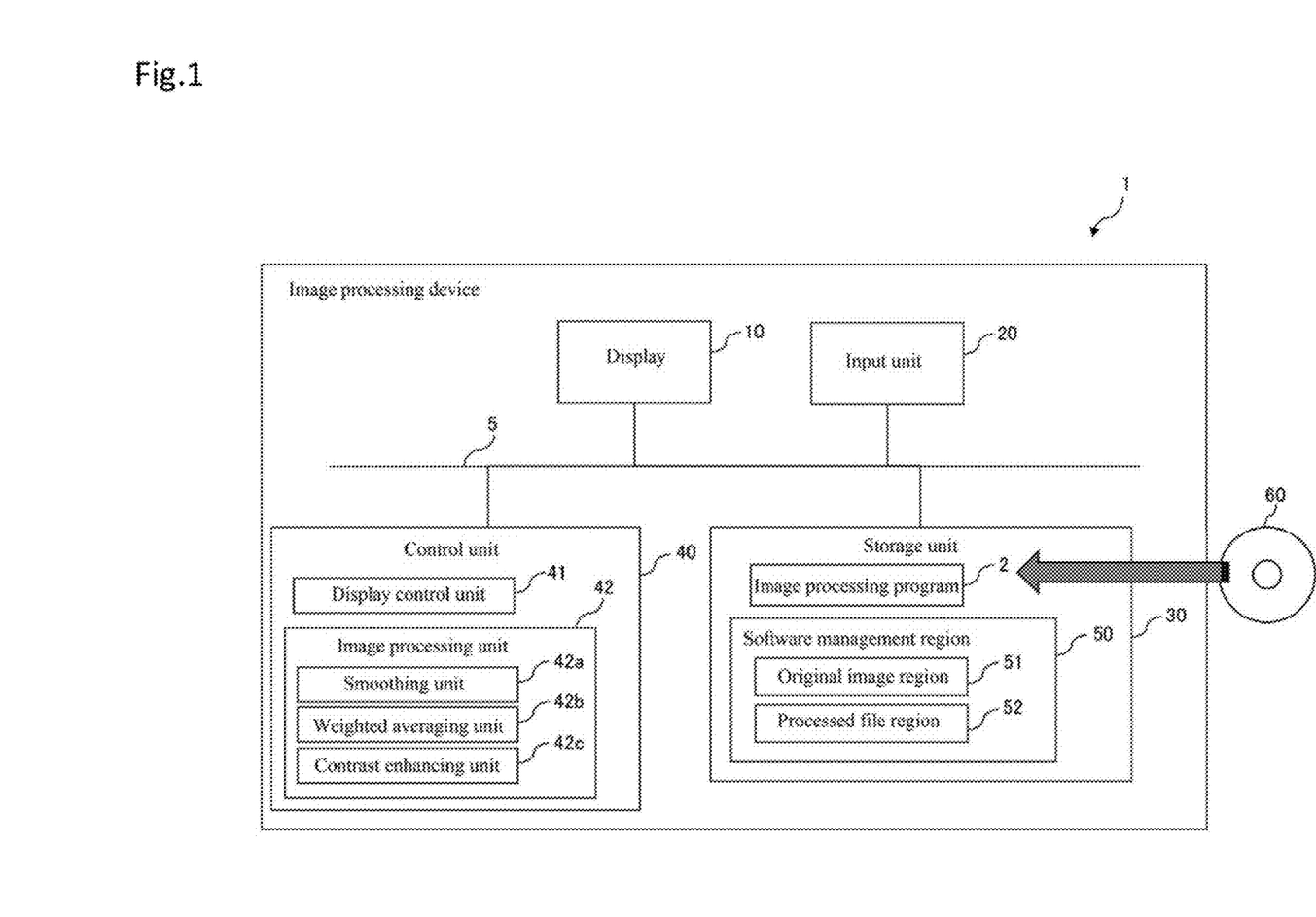
FIG. 1 is a block diagram illustrating an image processing device according to an embodiment of the present invention.

An image processing device 1 of FIG. 1 shows an embodiment of the image processing device according to the present invention. The image processing device 1 is a general-purpose personal computer. An image processing program 2, which is an embodiment of an image processing program according to the present invention, is provided and installed in the image processing device 1, for example, from a computer readable storage medium 60 such as a CD-ROM or a USB memory that stores the image processing program 2. The image processing program 2 is application software for assisting in image processing to be performed on a moving image and a still image. The image processing program 2 causes the image processing device 1 to execute steps included in the operations that will be described later.

The image processing device 1 includes a display 10, an input unit 20, a storage unit 30, and a control unit 40. These units 10 to 40 are connected to each other via, for example, a bus line or cable 5, and can suitably perform communication with each other. The display 10 is constituted by a liquid crystal display or the like, and displays, to a user, a screen and the like that will be described later. The input unit 20 is constituted by a mouse, a keyboard, a touch panel, and the like, and accepts a user operation on the image processing device 1. The storage unit 30 is a nonvolatile storage area that is constituted by a hard disk, a flash memory, or the like. The control unit 40 is constituted by a CPU, a ROM, a RAM, and the like.

The image processing program 2 is stored in the storage unit 30. The storage unit 30 secures a software management region 50. The software management region 50 is a region for use by the image processing program 2. The software management region 50 secures an original image region 51 and a processed file region 52. The functions of both regions 51 and 52 will be described later.

By reading out and executing the image processing program 2 stored in the storage unit 30, the control unit 40 virtually operates as a display control unit 41 and an image processing unit 42. Also, the image processing unit 42 virtually operates as a smoothing unit 42a, a weighted averaging unit 42b, and a contrast enhancing unit 42c during graininess eliminating processing, which will be described later. The display control unit 41 controls display of all elements such as screens, windows, and buttons that are displayed on the display 10. The image processing unit 42 executes various types of image processing. The operations of the units 41, 42, and 42a to 42c will be described later in detail.

<2. Details of Configuration and Operation of Image Processing Device>

Upon detecting that the user has performed a predetermined operation via the input unit 20, the control unit 40 starts the image processing program 2. After the start-up of the image processing program 2, a basic screen W1 (see FIG. 2) is displayed on the display 10.

<2-1. Image Data Loading>

Figure 2:
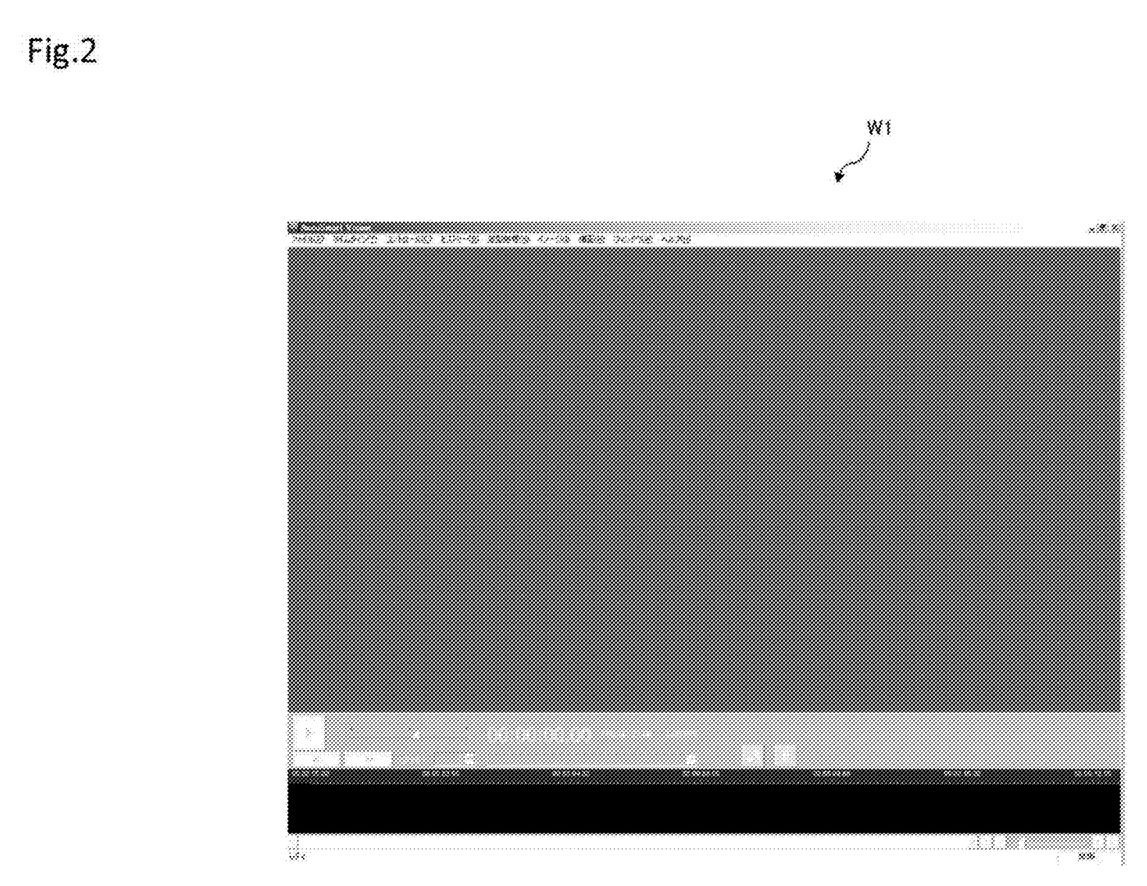
FIG. 2 is a diagram illustrating a basic screen before image data is loaded.

The basic screen W1 accepts, from the user, an instruction to load image data to the original image region 51. The image data loaded to the original image region 51 is to be subjected to reproduction processing and image processing, which will be described later. The control unit 40 loads image data from a still image file or a moving image file to the original image region 51. Note that in the present specification, "still image file" refers to a data file in a still image format, and "moving image file" refers to a data file in a moving image format.

In the case of loading image data from a still image file, the user operates the input unit 20 so as to designate one still image file or one folder. In the case of the former, the control unit 40 prompts the user to input the address path of this still image file in the storage unit 30 and the file name thereof. In the case of the latter, the control unit 40 prompts the user to input the address path of this folder in the storage unit 30 and the folder name thereof. Then, the control unit 40 saves the designated still image file or all still image files in the designated folder, as a still image file group, in the original image region 51. Note that in the present specification, "group" does not necessarily include a plurality of elements but may be one element.

On the other hand, in the case of loading of image data from a moving image file, the user operates the input unit 20 so as to input the address path of the one moving image file in the storage unit 30 and the file name thereof. Upon detecting that the user has designated the moving image file, the display control unit 41 displays a moving image load window (not shown) on the basic screen W1 in a superimposed manner. The moving image load window accepts, from the user, the selection of an arbitrary segment from among the entire segment on the time-line of the designated moving image file. Upon detecting that the user has selected a specific segment via the input unit 20, the control unit 40 generates a still image file group that has a one-to-one correspondence with a frame group included in the selected segment. Then, the control unit 40 saves the still image file group in the original image region 51. Accordingly, in the present embodiment, image data that is to be subjected to reproduction processing and image processing, which will be described later, is not of a moving image file but of a still image file.

Note that even if the still image file group loaded to the original image region 51 is derived from a still image file instead of a moving image file, the control unit 40 recognizes that the still image file group is sequenced along the time-line. The sequence is automatically determined based on a file attribute (file name, date of generation, date of update, or the like).

<2-2. Reproduction Processing>

After the still image file group is loaded to the original image region 51, the display control unit 41 displays display windows W2 (see FIG. 3) on the basic screen W1 in a superimposed manner. The number of generated display windows W2 corresponds to the number of time-lines of the still image me group loaded to the original image region 51.

Figure 3:
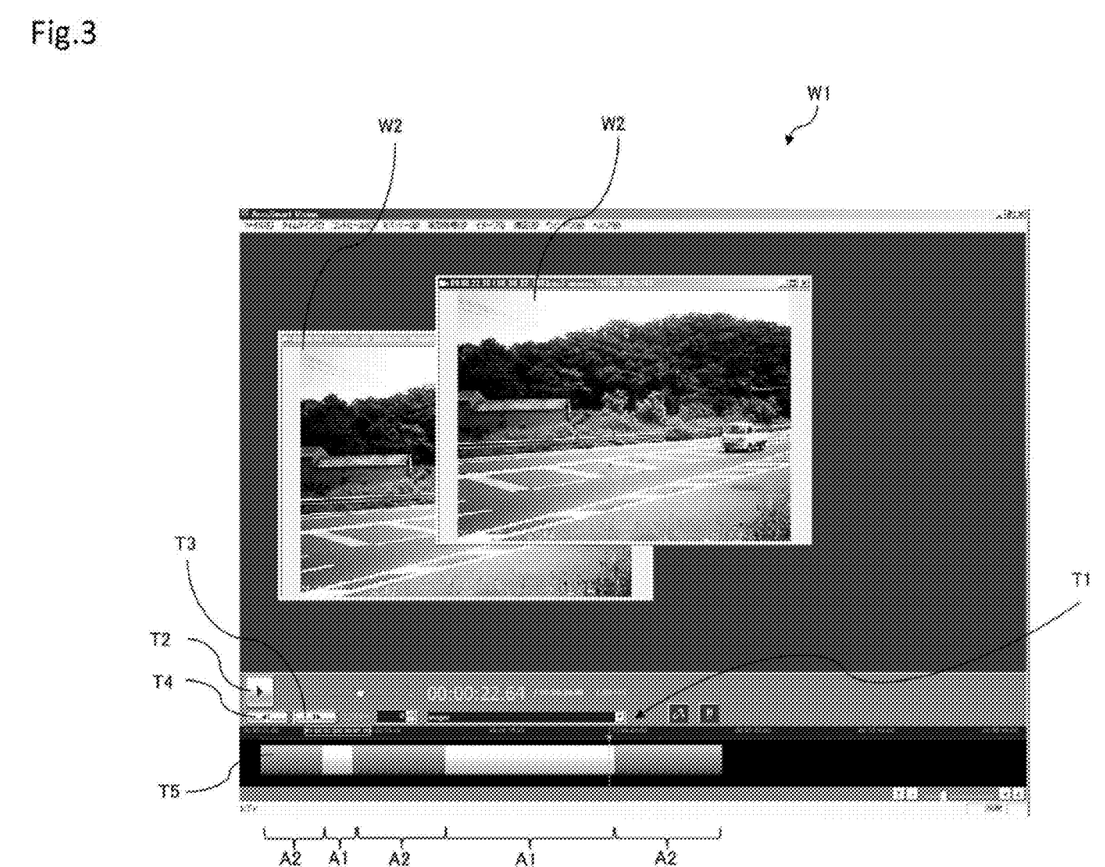
FIG. 3 is a diagram illustrating the basic screen after the image data is loaded.

First, one still image file (for example, the still image file that corresponds to the first frame on the time-line) that is included in the still image file group loaded to the original image region 51 is displayed in a display window W2. Then, as will be described later, the frame that is displayed in the display window W2 is switched upon an operation of the user.

As shown in FIG. 3, a window selection pull-down menu T1, a play button T2, a next frame button T3, a previous frame button T4, and a time-line bar T5 are arranged on the basic screen W1.

Even if a plurality of display windows W2 are present, there is one active display window W2. The window selection pull-down menu T1 accepts, from the user, the selection of which display window W2 is to serve as the active display window W2. Hereinafter, the time-line that corresponds to the active display window W2 is referred to as "active time-line", and the frame group that belongs to the active time-line is referred to as "active frame group". Furthermore, the frame that is currently displayed in the active display window W2 is referred to as "active frame".

The display control unit 41 can reproduce, within the active display window W2, the active frame group as a moving image. The play button T2 accepts an instruction to reproduce the active frame group as a moving image from the user. Upon detecting that the user has pressed the play button T2 via the input unit 20, the display control unit 41 displays, within the active display window W2, the frames included in the active frame group sequentially along the time-line in a frame-by-frame format. Note that the reproduction starts from the active frame at a point in time when the play button T2 is pressed. Furthermore, the play button T2 accepts, from a user, an instruction to stop the reproduction. Upon detecting that the user has pressed the play button 12 via the input unit 20 during the reproduction, the display control unit 41 fixes the display of the active display window W2 to the active frame at that point in time.

The next frame button T3 and the previous frame button T4 respectively accept, from the user, instructions to switch the active frame to the next frame and to the previous frame along the active time-line.

The time-line bar T5 is an object schematically showing the active time-line. The time-line bar T5 is equally divided as per the number of frames included in the active frame groups in the direction in which the bar extends. The $n^{-th}$ divided region from the left of the time-line bar T5 corresponds to the $n^{-th}$ frame of the active time-line (n is a natural number).

As shown in FIG. 3, the display control unit 41 displays, on the time-line bar T5, a divided region A1 that corresponds to a selected frame group and a divided region A2 that corresponds to a non-selected frame group in different display formats. "Selected frame group" refers to a frame group that belongs to a currently selected segment of the active time-line. "Non-selected frame group" refers to a frame group that belongs to a currently non-selected segment of the active time-line.

The time-line bar T5 accepts the selection of an arbitrary segment in the active time-line from the user. The segments selected at this time may be continuous, or may be discontinuous as shown in FIG. 3. Specifically by operating the divided region on the time-line bar T5 via the input unit 20, the user can select an arbitrary number of arbitrary frames from among the active, frame group. A plurality of divided regions can be selected at the same time. Each time the user selects a divided region of the time-line bar T5, the display control unit 41 immediately switches the active frame to the frame that corresponds to the most recently selected divided region. The image processing unit 42 recognizes the selected frame group as a target of image processing, which will be described later.

<2-3. Image Processing>

The image processing unit 42 can execute, with respect to the selected frame group, a plurality of image processing modules such as noise removal, graininess elimination, sharpness, brightness/contrast/chroma adjustment, image resolution, and addition of characters/arrows/mosaics. The image processing modules are incorporated in the image processing program 2.

The user can select arbitrary modules from the image processing modules in an arbitrary order for an arbitrary number of times, by performing an operation on the basic screen W1 via the input unit 20. Each time the image processing unit 42 detects that the user has selected an image processing module, the image processing unit 42 executes the image processing module with respect to the selected frame group at that point in time. Executing an image processing module with respect to a selected frame group refers to executing the image processing module with respect to each of the frames included in the selected frame group.

As the image processing module is sequentially executed with respect to a frame once, twice, trice, . . . , the frame is sequentially processed to a first-order frame, a second-order frame, a third-order frame, . . . . The 0-order frame corresponds to the still image file saved in the original image region 51. The (m+1)-order frame corresponds to the still image file obtained by executing the image processing module once with respect to the still image file of the m-order frame (m is an integer of 0 or more). The image processing unit 42 sequentially generates the still image files that correspond to the first-order frames onward, and saves these still image files separately in the processed file region 52.

Figure 4:
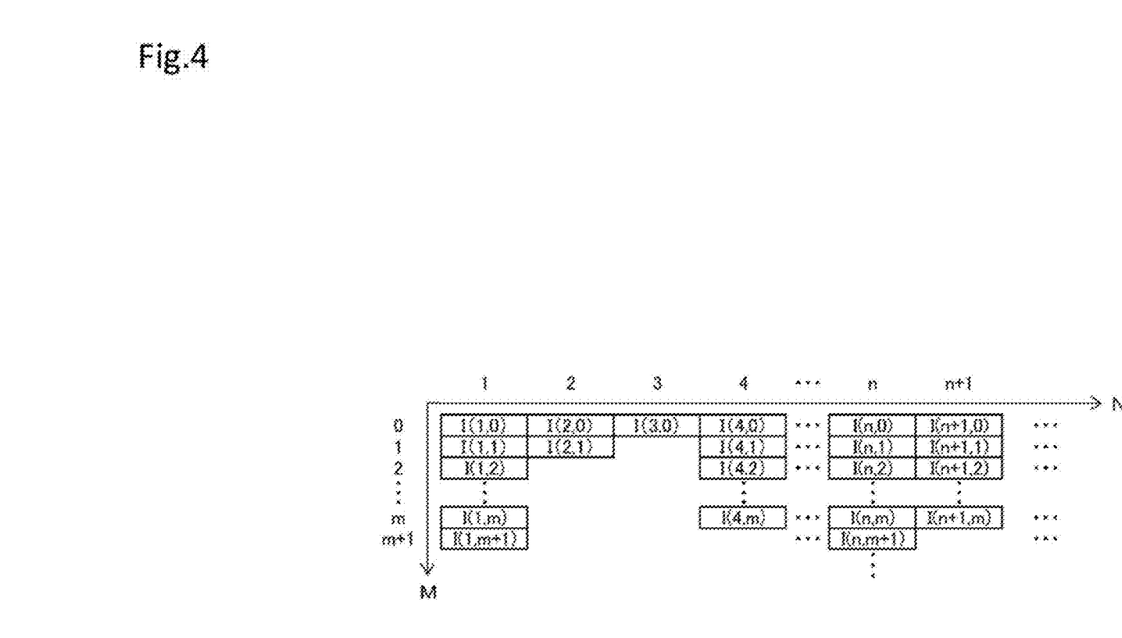
FIG. 4 is a diagram illustrating a still image group that belongs to one time-line.

FIG. 4 is a schematic diagram illustrating how the image group that belongs to one time-line is managed by the image processing program 2. In FIG. 4, the horizontal N axis denotes the order of frames on the time-line, and the vertical M axis denotes the order of processing. Each square of FIG. 4 that corresponds to the coordinates (n, m) in the N-M space denotes an image I (n, m). The image I (n, m) is the m-order image of the $n^{-th}$ frame on the time-line (n is a natural number and m is an integer of 0 or more).

The control unit 40 manages, for each frame, the value of the currently selected coordinate in as a parameter $m_s$. Immediately after the still image file group is loaded to the original image region 51, the coordinate $m_s$ has the default value 0. Then, the coordinate $m_s$ of the frame is incremented by 1 each time the image processing module is executed. Furthermore, the user can freely change the coordinate $m_s$ of an arbitrary frame by performing a predetermined operation via the input unit 20. Note that executing an image processing module with respect to a frame refers to executing the image processing module with respect to the $m_s$-order image of this frame. Accordingly, changing the coordinate $m_s$ means changing the target with respect to which the image processing module is to be executed. Displaying a frame refers to displaying the image of the coordinate $m_s$ of this frame. Accordingly, changing the coordinate $m_s$ also means changing the target to be displayed in the active display window W2.

<2-3-1. Graininess Eliminating Processing>

Figure 5:
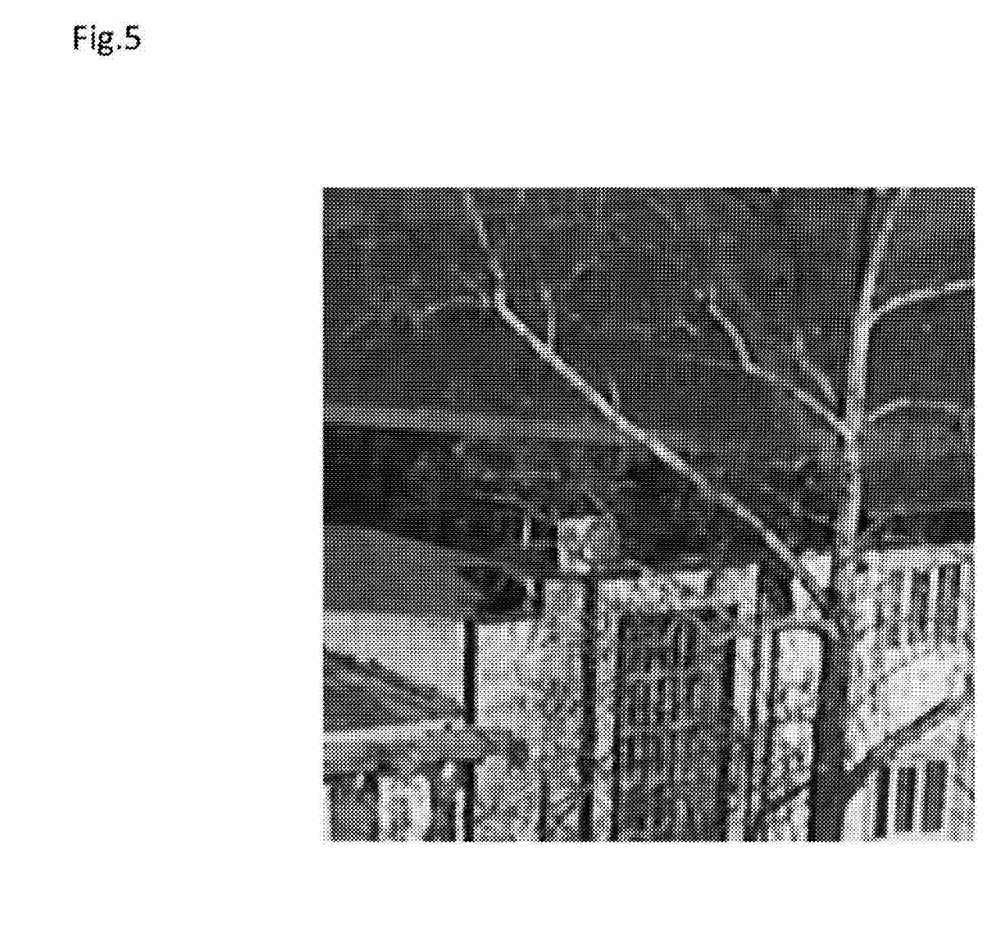
FIG. 5 is a diagram illustrating an example of an image obtained by capturing a monitor screen with a camera.

The following will describe graininess eliminating processing, which is one of the image processes implemented in the image processing program 2. The graininess eliminating processing refers to processing for eliminating graininess of an image. In this context, "graininess" typically refers to a dot pattern of a monitor screen of a television, a personal computer, or the like that appears in an image obtained by capturing the screen with a camera. However, the graininess eliminating processing can eliminate a pattern of fine features that appeared in the image regardless of the cause of the appearance of the pattern, that is, the graininess eliminating processing can eliminate any type of texture appearing in the image. In this sense, the graininess elimination according to the present embodiment can be construed as one type of noise removal. Note that the image shown in FIG. 5 is an example of a grainy image that is obtained by actually capturing the image on the monitor screen of a liquid crystal television.

Figure 6:
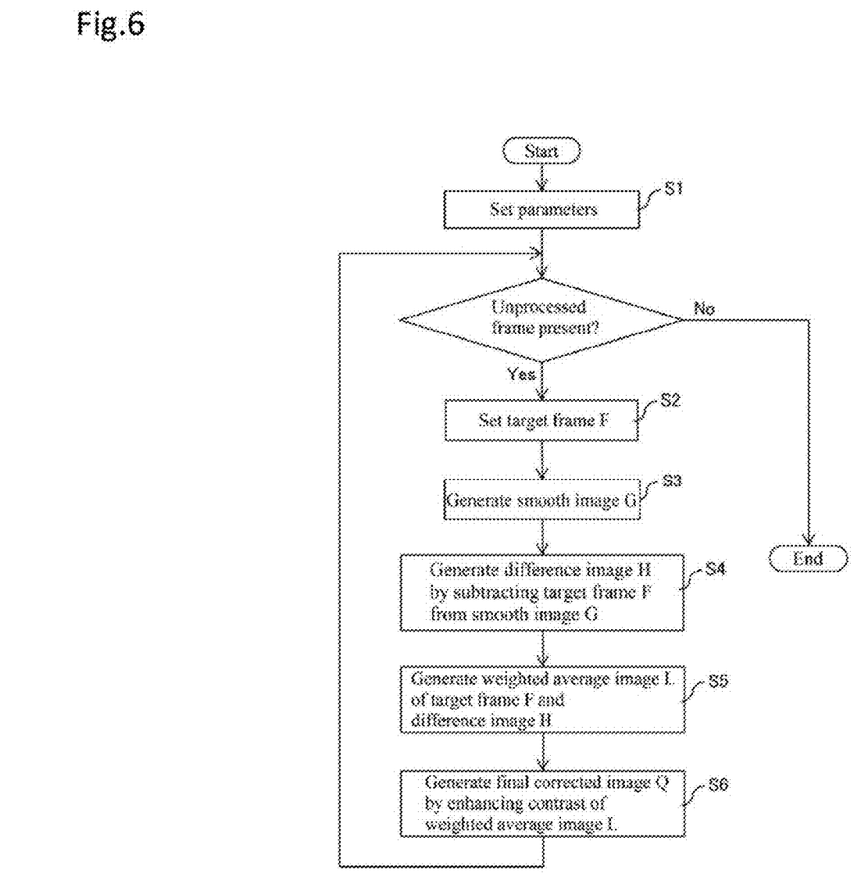
FIG. 6 is a flowchart illustrating a flow of graininess eliminating processing.

The graininess eliminating processing is performed according to the flowchart shown in FIG. 6. The graininess eliminating processing is started when it is detected that a user has performed a predetermined operation on the basic screen W1.

First, in step S1, parameters for use in the processing thereafter are set. Specifically, in step S1, a parameter setting window (not shown) is displayed on the basic screen W1 in a superimposed manner. The parameter setting window accepts, from the user, designation of parameters such as a smoothing algorithm, a radius R, and a mixture ratio α, the parameters being used in the processing thereafter. In the present embodiment, any of Mean, Gaussian, Median, and Laplacian can be selected as the smoothing algorithm. When it is detected that the setting of these parameters has ended and the user has pressed an OK button or the like that is arranged on the parameter setting window, the procedure advances to step S2.

Steps S2 to S6 are repeatedly performed on the frames included in the selected frame group. In step S2, the image processing unit 42 selects one unprocessed frame from the selected frame group, and sets the selected frame as a target frame F.

In subsequent step S3, the smoothing unit 42a smooths the target frame F in accordance with the smoothing algorithm designated in step S1. "Smoothing" in the present embodiment refers to processing for replacing the pixel value of each pixel included in the target frame F with an average (that may be a simple average or a weighted average) of the pixel values of pixels in a neighboring region of that pixel. The radius R that is designated in step S1 means the size of this neighboring region. The smoothing unit 42a sets a local region 2R×2R with each pixel located in the center thereof as the neighboring region, and performs smoothing thereon. Hereinafter, the image that is generated by smoothing the target frame F is referred to as "smooth image G".

The smooth image G is an image that is less grainy than the target frame F. Note that the larger the set radius R is, the less the graininess will be, but the more outlines (edges will also become blurred. The graininess eliminating processing according to the present embodiment can reduce the graininess while maintaining the outlines, and the radius R is preferably set to be relatively small in order to sufficiently exert this effect. Note that in this context, "relatively small" means that the radius R is smaller than the radius R that is needed for eliminating the graininess only using the smoothing of step S3. For example, it is assumed that the radius R needs to be about 3.5 for eliminating the graininess of a target frame F only using the smoothing of step S3. When the graininess eliminating processing according to the present embodiment is executed on this target frame F, the radius R may preferably be set to about 1, for example. In this case, it is possible to sufficiently maintain the outlines. On the other hand, in this case, the graininess of the smooth image G generated in step S3 would of course not be eliminated sufficiently. However, by performing following steps S4 and S5, ultimately, the graininess of the target image will sufficiently be eliminated while the outlines are sufficiently maintained.

Then, in step S4, the weighted averaging unit 42b generates a difference image by subtracting the target frame F from the smooth image G. Note that subtracting an image B from an image A means subtracting, for each pixel, the pixel value of the pixel of the image B from the pixel value, of the corresponding pixel of the image A. Note that in the present embodiment, the target frame F is a color image that has three color components, namely, RGB components, and the pixel value of each color component is defined as having a value of 0 to 255. In this case, the pixel value subtraction is performed for each color component.

In the difference image that is obtained only by the processing above, the pixel values of pixels that are not grainy are substantially 0, the pixel values of pixels that have bright graininess have negative values, and the pixel values of pixels that have dark graininess have positive values. The bright graininess refers to the graininess of a pixel that has a larger pixel value than a pixel value that the pixel would have if such a graininess did not exist, and the dark graininess refers to the graininess of a pixel that has a smaller pixel value than a pixel value that the pixel would have if such a graininess did not exist. Note that typically a dot pattern occurring due to close-up capturing of the monitor screen appears bright, and grid-like lines in the vicinity of the dot pattern appear dark. Meanwhile, since, in the present embodiment, the pixel values are defined as having a value of 0 to 255, the difference image may lose information regarding the bright graininess. Accordingly in step S4 of the present embodiment, it is presumed that the target frame F is subtracted from the smooth image G, and then 128 is uniformly added to the pixel value of each pixel. The uniform addition is performed for each color component. Hereinafter, the image to which such adding processing is performed is referred to as "difference image H". As a result, the difference image H obtained in step S4 is an image in which a part having dark graininess appears whitish, a part having bright graininess appears blackish, an outline part appears whitish or blackish, and the remaining part appears in gray.

In summary, the following relationship is satisfied between $V_F(j)$, $V_G(j)$, and $V_H(j)$ (j=1, 2, . . . , J):

$$V_H(j)=V_G(j)-V_F(j)+128 \quad \text{(Formula 1)}$$

where $V_F(j)$ is the pixel value of the pixel number j of the target frame F (j=1, 2, . . . , J, where J is the number of pixels of the target frame F), $V_G(j)$ is the pixel value of the pixel number j of the smooth image G, and $V_H(j)$ is the pixel value of the pixel number j of the difference image H.

In subsequent step S5, the weighted averaging unit 42b weights the target frame F and the difference image H using the mixture ratio α set in step S1, and adds them together. Specifically, the weighted averaging unit 42b adds, for each pixel, the value obtained by multiplying the pixel value of the pixel of the difference image H by α to the value obtained by multiplying the pixel value of the corresponding pixel of the target frame F by (1−α). The processing of this addition is performed for each color component. Note that the mixture ratio α may be set to any value (excluding 0 and 1) from 0 to 1. Furthermore, α is preferably set to be larger than 0.5. In this case, in the weighted average image L, the graininess and the outline are each amplified and mixed Hereinafter, the image obtained in step S5 is referred to as "weighted average image L". The following relationship is satisfied between $V_L(j)$, $V_H(j)$ and $V_F(j)$ (j=1, 2, . . . , J):

$$V_L(j)=\alpha V_H(j)+(1-\alpha)V_F(j) \quad \text{(Formula 2)}$$

where $V_L(j)$ is the pixel value of the weighted average image L.

Note that the following Formula 3 is obtained by substituting Formula 1 into Formula 2:

$$V_L(j)=(1-2\alpha)V_F(j)+\alpha V_G(j)+128\alpha \quad \text{(Formula 3)}$$

Meanwhile, fine features or textures such as graininess have a higher spatial frequency than that of outlines, and thus are more susceptible to the influence of the smoothing of step S2. Therefore, much more pieces of information regarding the graininess than information regarding the outlines remain in the difference image H. Accordingly, in the weighted average image L of the difference image H and target frame F, graininess is eliminated but outlines relatively remain as they are. Note that the weighted average image L, in which the overall grayish difference image H is included, has a low contrast as a whole.

Accordingly, in subsequent step S6, the contrast enhancing unit 42c performs correction so as to enhance the contrast of the weighted average image L. The weighted average image L subjected to contrast correction serves as a final corrected image Q that was subjected to the graininess eliminating processing. Similar to the weighted average image L, the corrected image Q is an image in which the graininess is eliminated while the outlines are maintained compared to the target frame F. Note that in the present embodiment, the contrast is corrected according to following Formula 4:

$$V_Q(j)=(V_L(j)-128)*(1/(1-\alpha))+128 \quad \text{(Formula 4)}$$

where $V_Q(j)$ is the pixel value of the pixel number j (j=1, 2, . . . , J) of the corrected image Q.

When steps S2 to S6 above have been performed repeatedly on all of the frames included in the selected frame group, the graininess correction processing ends.

After the graininess eliminating processing has ended, the user can checks the image in which the graininess is eliminated while the outlines are maintained by causing the corrected image Q to be displayed on the active display window W2.

<3. Usage>

The image processing program 2 can handle image processing with respect to various types of moving images, and can be used also in a scene where, for example, an organization such as the police analyzes surveillance images from security cameras in order to investigate an incident. Specifically, an investigation organization such as the police checks pictures from security cameras near the location of the incident. Here, the pictures from the security cameras at the sites are often recorded on video tapes, and it is thus difficult to convert them into digital pictures that can be subjected to image processing with a computer. Furthermore, even if the investigation organization is permitted to view the surveillance images at a corresponding place of the owners of the security cameras, it is not always the case that the investigation organization can also request the owners to submit the surveillance images. Accordingly, in reality, the investigation organization often captures an image on an on-site monitor screen with a digital camera or the like, and the image is taken away by the investigation organization. The graininess eliminating processing according to the foregoing embodiment can be used for eliminating, from such an image captured over the monitor screen, the graininess resulting from the dot pattern of the monitor screen.

Meanwhile, the foregoing graininess eliminating processing is particularly advantageous for an image in which a component having a higher spatial frequency than that of the graininess that is to be eliminated is not included in the original picture (picture that is not grainy). Note that, in the case of an image obtained by capturing a monitor screen, typically a component having a higher frequency than that of a dot pattern of the monitor screen cannot be included in the picture. Accordingly, the graininess eliminating processing according to the present embodiment is particularly advantageous for eliminating the dot pattern that has appeared due to shooting an image of the monitor screen.

<4. Modifications>

The embodiment of the present invention has been described so far, but the present invention is not limited to the foregoing embodiment and various modifications are possible without departing from the essence thereof. For example, the following modifications are possible.

<4-1>

The method for generating the weighted average image L is not limited to the above-described method. For example, in step S4 of the foregoing embodiment, the difference image H is generated by subtracting the target frame F from the smooth image G, but an inverse difference image may be obtained by subtracting the smooth image G from the target frame F. In this case, the weighted averaging unit 42b can obtain the difference image H by inverting the tone of the inverse difference image. The processing thereafter can be performed similar to the foregoing embodiment.

Alternatively, instead of the processing of steps S4 and S5 being performed step-by-step, a weighted average image L may be generated directly from the target frame F and the smooth image G based on the above Formula 3.

4-2>

In the foregoing embodiment, step S6 may be omitted. In this case, the weighted average image L will serve as a final corrected image subjected to the graininess eliminating processing. Note that it is sufficient that, only when a user considers the contrast of the weighted average image L as low and feels that it is unfavorable, the user may manually obtain a corrected image Q by additionally performing contrast adjusting image processing. Also, if, in step S4, no processing of uniform addition of a predetermined value to the pixel values is performed, the weighted average image L cannot have a low contrast. In this case, the contrast enhancement processing of step S6 is of course not necessary.

Example

<5. Evaluation>

Hereinafter, an example of the present invention will be described. However, the present invention is not limited to the following example. In this example, steps S3 to S6 according to the foregoing embodiment in which the radius R is 1 were executed on the target image shown in FIG. 5, and the image (corrected image Q) shown in FIG. 7 was obtained. On the other hand, only step S3 (smoothing processing) in which the radius R is 3 was executed on the target image shown in FIG. 5, and the image shown in FIG. 8 was obtained.

Figure 7:
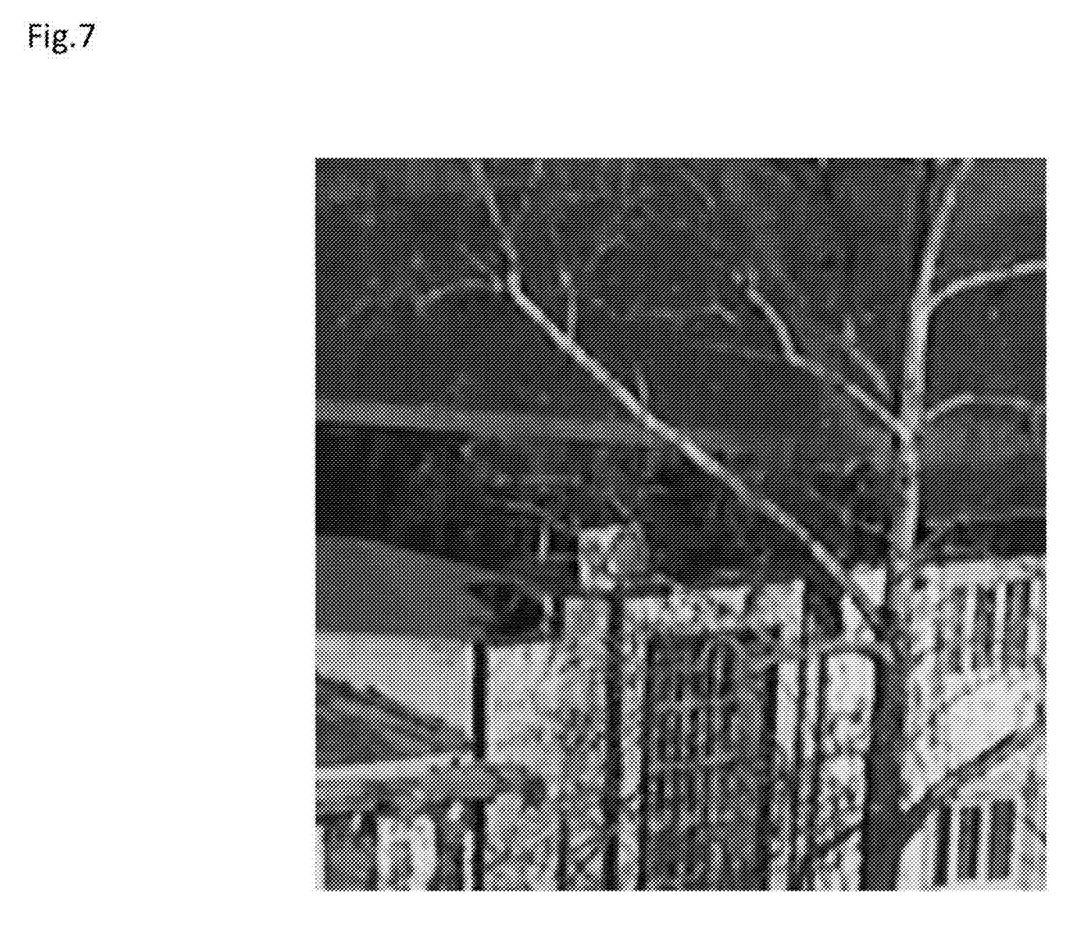
FIG. 7 is a diagram illustrating an image subjected to graininess elimination according to a working example.
Figure 8:
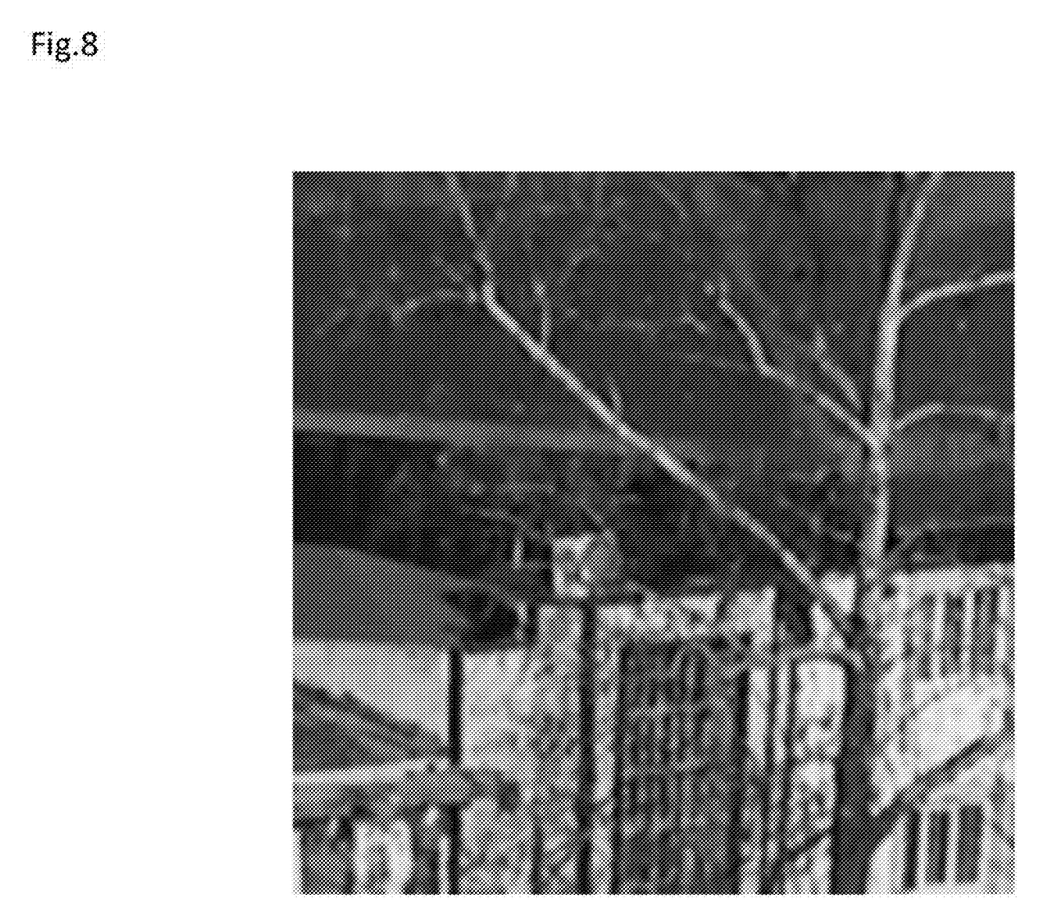
FIG. 8 is a diagram illustrating an image subjected to graininess elimination according to a comparative example.

By comparing FIG. 5 and FIG. 7, it is clear that the dot pattern can be eliminated as per the graininess elimination algorithm of the foregoing embodiment. Furthermore, by comparing FIG. 7 and FIG. 8, it is clear that the graininess can be eliminated while the outlines are maintained as per the graininess elimination algorithm of the foregoing embodiment.

REFERENCE SIGNS LIST

1 Image processing device
2 Image processing program
42a Smoothing unit
42b Weighted averaging unit
42c Contrast enhancing unit

The invention claimed is:

1. An image processing method for eliminating graininess of a target image, comprising the steps of:
generating a smooth image by smoothing the target image so that the graininess remains in the smooth image; and
generating a weighted average image by performing weighted averaging of the target image and a difference image using positive mixture ratios respectively to the target image and the difference image, the positive mixture ratios being constant not depending on pixel values of the target image, the difference image being a first image obtained by subtracting the target image from the smooth image or a second image obtained by uniformly adding a constant value to each pixel value of the first image, the positive mixture ratio to the difference image being $\alpha$, the positive mixture ratio to the target image being 1-$\alpha$ and $\alpha>0.5$.

2. An image processing device for eliminating graininess of a target image, comprising:
a smoothing unit of a central processing unit (CPU) configured to generate a smooth image by smoothing the target image; and
a weighted averaging unit of the CPU configured to generate a weighted average image by performing weighted averaging of the target image and a difference image using positive mixture ratios respectively to the target image and the difference image, the positive mixture ratios being constant not depending on pixel values of the target image, the difference image being a first image obtained by subtracting the target image from the smooth image or a second image obtained by uniformly adding a constant value to each pixel value of the first image, the positive mixture ratio to the difference image being a, the positive mixture ratio to the target image being 1-$\alpha$ and $\alpha>0.5$.

3. The image processing device according to claim 1, further comprising
a contrast enhancing unit of the CPU configured to enhance contrast of the weighted average image.

4. The image processing device according to claim 3, wherein the weighted averaging unit is configured to generate an inverse difference image obtained by subtracting the smooth image from the target image and then generate the difference image by inverting a tone of the inverse difference image.

5. The image processing device according to claim 3, wherein the weighted averaging unit is configured to generate the first and then generate the weighted average image by performing the weighted averaging of the target image and the first image, or
the weighted averaging unit is configured to generate the second image and then generate the weighted average image by performing the weighted averaging of the target image and the second image.

6. The image processing device according to claim 5, wherein the weighted averaging unit is configured to generate an inverse difference image obtained by subtracting the smooth image from the target image and then generate the difference image by inverting a tone of the inverse difference image.

7. The image processing device according to claim 1, wherein the weighted averaging unit is configured to generate the first image and then generate the weighted average image by performing the weighted averaging of the target image and the first-image, or
the weighted averaging unit is configured to generate the second image and then generate the weighted average image by performing the weighted averaging of the target image and the second image.

8. The image processing device according to claim 7, wherein the weighted averaging unit is configured to generate an inverse difference image obtained by subtracting the smooth image from the target image and then generate the difference image by inverting a tone of the inverse difference image.

9. The image processing device according to claim 2, wherein the weighted averaging unit is configured to generate an inverse difference image obtained by subtracting the smooth image from the target image and then generate the difference image by inverting a tone of the inverse difference image.

10. A non-transitory computer readable medium storing an image processing program for eliminating graininess of a target image, the image processing program causing a computer to execute the steps of:

generating a smooth image by smoothing the target image; and generating a weighted average image by performing weighted averaging of the target image and a difference image using positive mixture ratios respectively to the target image and the difference image, the positive mixture ratios being constant not depending on pixel values of the target image, the difference image being a first image obtained by subtracting the target image from the smooth image or a second image obtained by uniformly adding a constant value to each pixel value of the first image, the positive mixture ratio to the difference image being a, the positive mixture ratio to the target image being 1-$\alpha$ and $\alpha>0.5$.

* * * * *